United States Patent
Enomoto

(10) Patent No.: US 12,233,963 B2
(45) Date of Patent: Feb. 25, 2025

(54) STEERING DEVICE

(71) Applicant: HITACHI ASTEMO, LTD., Hitachinaka (JP)

(72) Inventor: Masatoshi Enomoto, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 546 days.

(21) Appl. No.: 17/636,172

(22) PCT Filed: Jun. 5, 2020

(86) PCT No.: PCT/JP2020/022232
§ 371 (c)(1),
(2) Date: Feb. 17, 2022

(87) PCT Pub. No.: WO2021/039009
PCT Pub. Date: Mar. 4, 2021

(65) Prior Publication Data
US 2022/0332360 A1 Oct. 20, 2022

(30) Foreign Application Priority Data
Aug. 29, 2019 (JP) .................................. 2019-156384

(51) Int. Cl.
*B62D 5/04* (2006.01)
*F16H 25/22* (2006.01)
*F16H 25/24* (2006.01)

(52) U.S. Cl.
CPC ......... *B62D 5/0448* (2013.01); *B62D 5/0445* (2013.01); *F16H 25/2214* (2013.01);
(Continued)

(58) Field of Classification Search
CPC .. B62D 5/0445; B62D 5/0448; F16H 25/2472
See application file for complete search history.

(56) References Cited

U.S. PATENT DOCUMENTS

| 2010/0320026 A1 | 12/2010 | Yoshida et al. |
| 2014/0353070 A1* | 12/2014 | Tsukagoshi .......... B62D 5/0424 180/444 |
| 2019/0382047 A1* | 12/2019 | Yoshida ................ F16C 35/077 |

FOREIGN PATENT DOCUMENTS

| JP | 2001-254749 A | 9/2001 |
| JP | 2007-132480 A | 5/2007 |

(Continued)

OTHER PUBLICATIONS

International Search Report dated Jul. 14, 2020 issued in International Application No. PCT/JP2020/022232, with English translation, 5 pages.

(Continued)

*Primary Examiner* — Kevin Hurley
(74) *Attorney, Agent, or Firm* — FOLEY & LARDNER LLP

(57) ABSTRACT

Provided is a steering device including a lock nut that fixes an outer race of a turning nut threadably engaged with a rack bar. A loosening prevention protruding portion formed on a lock nut main body is brought into contact with a radial-direction abutting portion to prevent loosening of the lock nut with a frictional force. At the same time, a lock nut recessed portion for reducing mechanical stiffness is formed in an outer peripheral surface of the loosening prevention protruding portion so that an external force acting from the outer race is buffered by the lock nut recessed portion. In this manner, a decrease in contact area between the loosening prevention protruding portion and the radial-direction abutting portion is reduced.

10 Claims, 11 Drawing Sheets

(52) U.S. Cl.
CPC ....... *F16H 25/2472* (2013.01); *B62D 5/0403* (2013.01); *B62D 5/0424* (2013.01)

(56) References Cited

FOREIGN PATENT DOCUMENTS

| JP | 2015-160493 A | | 9/2015 |
|---|---|---|---|
| KR | 20170028694 A | * | 3/2017 |
| WO | WO-2009/101794 A1 | | 8/2009 |
| WO | WO-2018/135107 A1 | | 7/2018 |

OTHER PUBLICATIONS

Written Opinion dated Jul. 14, 2020 issued in International Application No. PCT/JP2020/022232, with English abstract, 6 pages.

* cited by examiner

STEERING DEVICE

TECHNICAL FIELD

The present invention relates to a steering device to be mounted in an automobile, and more particularly, to a steering device including a turning nut that drives a turning shaft that turns steered wheels.

BACKGROUND ART

In steering devices, there is known a so-called electric power steering device. The electric power steering device detects a rotation angle, a rotating direction, and a rotational torque of a steering shaft to be rotated by a steering wheel, independently of drive of a turning shaft (hereinafter referred to as "rack bar"), which is caused by the steering shaft. The electric power steering device rotates an electric motor based on detection signals obtained by the detection, transmits the rotation of the electric motor to a turning nut, and drives the turning shaft received inside the turning nut in its axial direction to assist a steering force.

Besides, there is also known a so-called steer-by-wire steering device. The steer-by-wire steering device feeds a rotating operation of the steering wheel as a control/drive signal to the electric motor without mechanically coupling the steering shaft and the rack bar, and transmits the rotation of the electric motor to the turning nut to drive the rack bar received inside the turning nut in the axial direction to thereby achieve steering.

Each of the above-mentioned power steering devices using the electric motor includes a ball bearing on an outer peripheral side of the turning nut so as to rotatably hold the turning nut, for example, as described in Japanese Patent Application Laid-open No. 2015-160493 (Patent Literature 1). An outer race of the ball bearing is fixed to an inner wall of a turning nut accommodating portion of a rack housing. Further, for prevention of movement of the outer race in the axial direction of the rack bar, a side end surface of the outer race, which extends in a radial direction, is pressed by a lock nut to restrict the movement of the outer race.

CITATION LIST

Patent Literature

PTL 1: JP 2015-160493 A

SUMMARY OF INVENTION

Technical Problem

In general, as described in Patent Literature 1, the lock nut is fixed through threadable engagement with a thread portion formed on the inner wall of the turning nut accommodating portion. The threadably engaged lock nut has an outer race contact surface formed on its inner side. When the outer race contact surface is brought into contact with a side end surface of the outer race of the ball bearing, which extends in the radial direction, with a wave washer therebetween, the lock nut restricts movement of the ball bearing in the axial direction (axial direction of the rack bar).

Further, the lock nut has a loosening prevention protruding portion having a loosening prevention function. The loosening prevention protruding portion is located on a radially outer side of the outer race of the ball bearing, and is brought into contact with the inner wall of the turning nut accommodating portion. Specifically, loosening of the lock nut is prevented with a frictional force generated between the loosening prevention protruding portion and the inner wall of the turning nut accommodating portion that is in contact with the loosening prevention protruding portion. Thus, a contact area between the loosening prevention protruding portion and the inner wall of the turning nut accommodating portion being in contact with the loosening prevention protruding portion determines the frictional force.

Incidentally, an impulsive external force in the axial direction sometimes acts on the outer race contact surface of the lock nut from the outer race side under a state in which the lock nut is tightened. For example, a tire is subjected to impact from a road surface while running thereon. The impact is transmitted to the turning nut via the rack bar. Then, when the outer race of the ball bearing fixed to the turning nut is brought into contact with the outer race contact surface of the lock nut, the impact acts on the outer race contact surface of the lock nut as an external force in the axial direction.

Thus, a rotational motion (rocking motion) of the lock nut occurs about a point on an outer peripheral side of the thread portion of the lock nut as a center of the rotational motion. The loosening prevention protruding portion inclines due to the rotational motion, bringing about a phenomenon in which the contact area between the loosening prevention protruding portion and the inner wall of the turning nut accommodating portion being in contact with the loosening prevention protruding portion decreases to lower the frictional force. A specific description thereof is given later.

As described above, the frictional force for fixing the lock nut is lowered, resulting in a problem of loosening of the lock nut. A special loosening prevention mechanism may be provided. However, extra components are needed or the number of assembly steps increases, leading to a problem of a significant increase in price of the steering device.

An object of the present invention is to provide a novel steering device that enables lock nut loosening prevention without the need for a special loosening prevention mechanism.

Solution to Problem

According to one embodiment of the present invention, there is provided a steering device for driving steered wheels of an automobile, the steering device including:
- a housing internally including a turning shaft accommodating space, a speed reducer accommodating space, an outer race abutting portion, a lock nut fastening female thread portion, and a lock nut abutting portion;
- a turning shaft, which is provided in the turning shaft accommodating space, and includes a turning shaft main body having a bar-like shape and a turning shaft ball screw groove formed on an outer peripheral surface of the turning shaft main body;
- a turning nut, which is provided in the speed reducer accommodating space, includes a nut main body having a tubular shape, a nut ball screw groove formed on an inner peripheral surface of the nut main body, and an inner race groove formed on an outer peripheral surface of the nut main body, and is threadably engaged with the turning shaft;
- a plurality of circulating balls, which are provided between the turning shaft ball screw groove and the nut ball screw groove, and are configured to transmit a rotational force of the turning nut to the turning shaft;

a ball bearing, which is provided in the speed reducer accommodating space, and includes an outer race including an outer race main body having a tubular shape and an outer race groove formed on an inner peripheral side of the outer race main body, and balls provided between the inner race groove formed on the outer peripheral side of the nut main body and the outer race groove;

an electric actuator configured to apply a rotational force to the turning nut; and a lock nut, which is provided in the speed reducer accommodating space, and includes a lock nut main body, a lock nut fastening male thread portion, a loosening prevention protruding portion, and a lock nut recessed portion, wherein the lock nut main body is provided in such a manner that the outer race is sandwiched between the lock nut main body and the outer race abutting portion in a direction of an axis of the turning shaft, wherein the lock nut fastening male thread portion is formed on an outer peripheral side of the lock nut main body so as to be threadably engageable with the lock nut fastening female thread portion, wherein the loosening prevention protruding portion is formed to protrude from the lock nut main body in the direction of the axis of the turning shaft, and, when the lock nut is fastened to the housing, is contactable with the lock nut abutting portion so as to generate a fastening force for the lock nut, and wherein the lock nut recessed portion is formed in the loosening prevention protruding portion so that a thickness of the loosening prevention protruding portion in a radial direction orthogonal to the axis of the turning shaft becomes smaller than a thickness of a region of the loosening prevention protruding portion, which is adjacent to the lock nut recessed portion, or is formed in the lock nut main body so that a thickness of the lock nut main body in the direction of the axis of the turning shaft becomes smaller than a thickness of a region of the lock nut main body, which is adjacent to the lock nut recessed portion.

Advantageous Effects of Invention

According to the one embodiment of the present invention, even when the lock nut main body is inclined by the external force acting from the outer race, the lock recessed portion prevents transmission of the external force to a distal end of the loosening prevention protruding portion. Accordingly, inclination of the loosening prevention protruding portion is restricted to reduce a decrease in contact area between the loosening prevention protruding portion and the radial-direction abutting portion. As a result, the loosening of the lock nut can be prevented. Further, loosening of the lock nut can be prevented without the need for a special loosening prevention mechanism.

DESCRIPTION OF EMBODIMENTS

Now, a detailed description is given of embodiments of the present invention with reference to the drawings, but the present invention is not limited to the following embodiments, and includes various modifications and application examples in the scope thereof within a technical concept of the present invention.

Prior to description of embodiments of the present invention, first, description is given of a configuration of an electric power steering device based on which the present invention is achieved, configurations of a related-art lock nut and a related-art outer race, and problems thereof.

Figure 1:
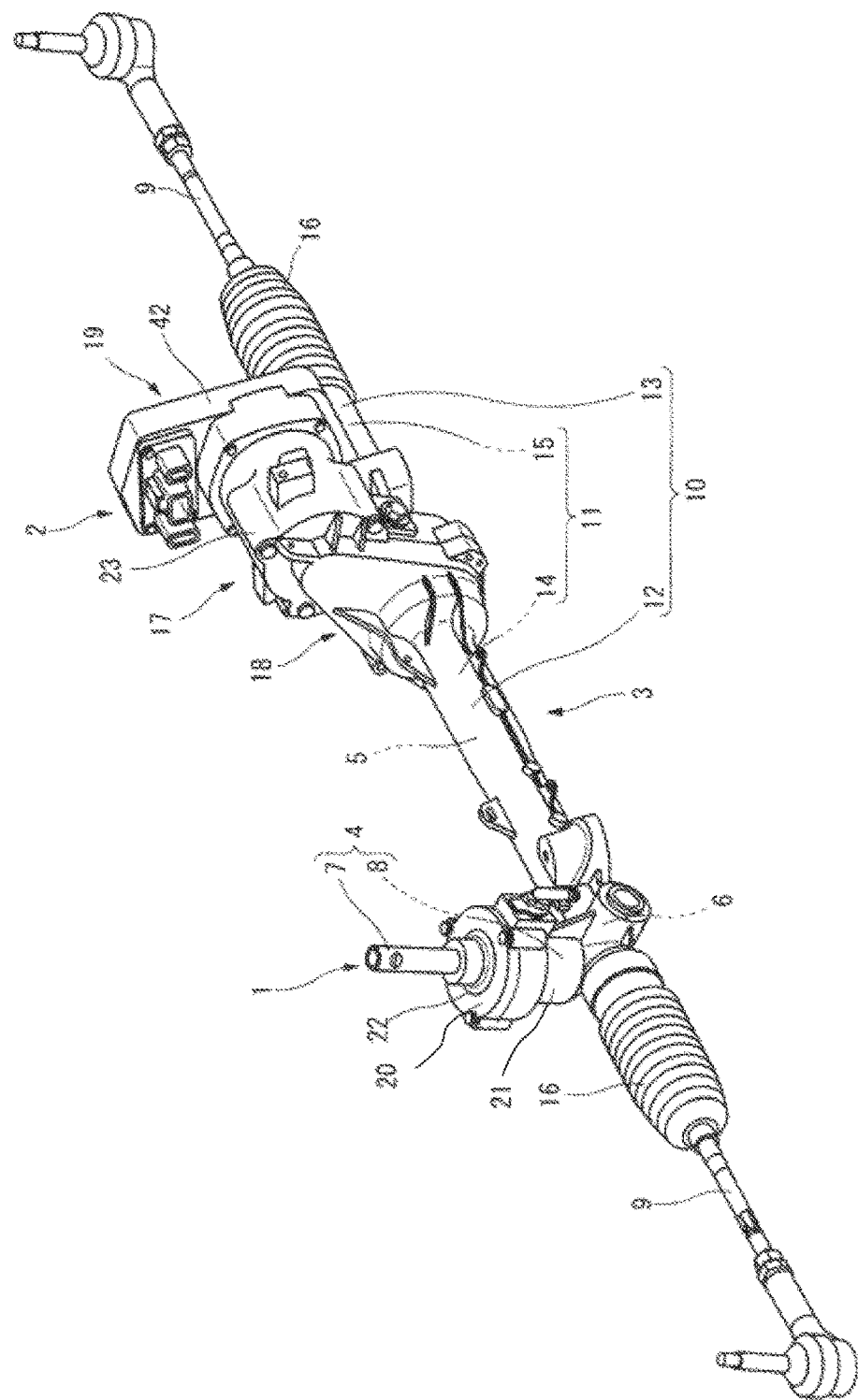
FIG. 1 is a perspective view for illustrating an exterior of an electric power steering device.
Figure 2:
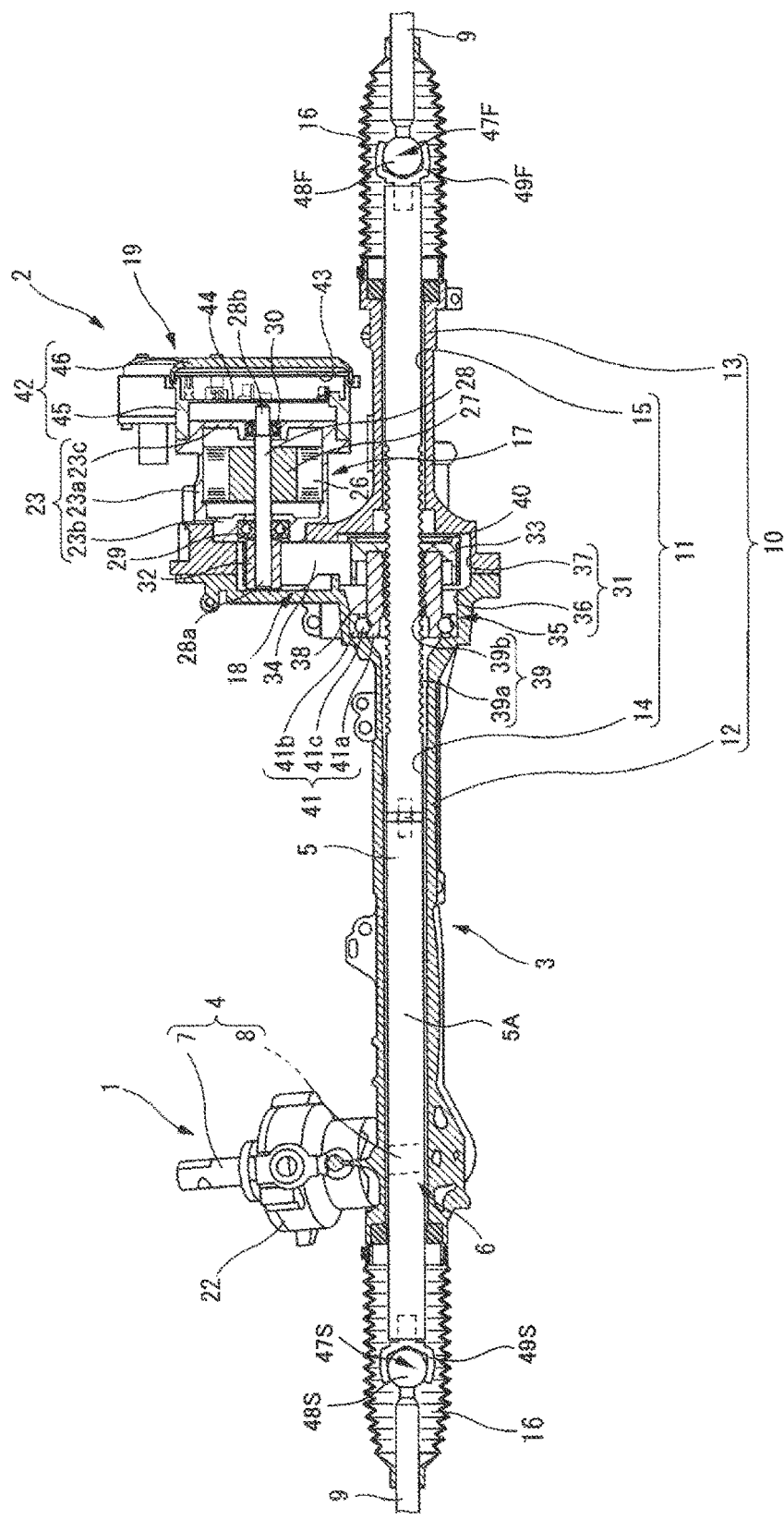
FIG. 2 is a longitudinal sectional view of the electric power steering device illustrated in FIG. 1.

In FIG. 1 and FIG. 2, an electric power steering device is illustrated. The electric power steering device detects a rotation angle, a rotating direction, and a rotational torque of a steering shaft to be rotated by a steering wheel, independently of drive of a rack bar, which is caused by the steering shaft. The electric power steering device rotates an electric motor based on detection signals obtained by the detection, transmits the rotation of the electric motor to a turning nut, and drives the rack bar received inside the turning nut to assist a steering force.

In FIG. 1 and FIG. 2, a steering mechanism 1 includes a steering shaft 4, a rack bar 5, and a conversion mechanism 6. The steering shaft 4 is connected to a steering wheel (not shown) provided in a driver's cab of a vehicle. The rack bar 5 serves as a turning shaft linked with steered wheels. The conversion mechanism 6 links the steering shaft 4 and the rack bar 5 (corresponding to "turning shaft main body having a bar-like shape" in the claims) with each other.

The conversion mechanism 6 is a so-called rack and pinion mechanism having pinion teeth (not shown) and rack teeth (not shown). The pinion teeth are formed at a distal end of the steering shaft 4. The rack teeth are formed at an outer periphery of the rack bar 5.

In this case, the rack bar 5 represents a turning member. Besides the rack bar 5, the turning member includes a pitman arm. The turning member is not limited to the pitman arm, and may include, for example, a link mechanism provided between a turning actuator and each of the steered wheels.

The steering shaft 4 includes an input shaft 7 and an output shaft 8. The input shaft 7 has one axial end coupled to the steering wheel so that the input shaft 7 is turning integrally therewith. The output shaft 8 has one axial end connected to another axial end of the input shaft 7 through intermediation of a torsion bar (not shown).

As illustrated in FIG. 2, the rack bar 5 has both axial ends linked with a pair of steered wheels through intermediation of tie rods 9 and a pair of knuckle arms, respectively. With this structure, when the rack bar 5 moves in its axial direction, the knuckle arms are pulled through intermediation of the tie rods 9 to change orientations of the pair of steered wheels.

Ends of the pair of tie rods 9 and a pair of ends of the rack bar 5 are coupled to each other through intermediation of a first ball joint 47F and a second ball joint 47S, respectively. The ball joints 47F and 47S include ball portions 48F and 48S and joint portions 49F and 49S, respectively. The ball portions 48F and 48S are fixed to the ends of the pair of tie rods 9, respectively. The joint portions 49F and 49S surround and accommodate the ball portions 48F and 48S, respectively.

Further, the rack bar 5 is accommodated in a rack bar accommodating portion 11 (corresponding to "turning shaft accommodating space" in the claims) of a rack housing 10 having a substantially cylindrical shape. The rack housing 10 forms a part of a housing 3. The rack bar 5 is accommodated in the rack bar accommodating portion 11 so as to be movable in the axial direction with both axial ends exposed to an outside.

The rack housing 10 (corresponding to "housing" in the claims) is made of a metal, and is formed by casting as two parts being separate in the axial direction. A first rack housing part 12 and a second rack housing part 13 are integrated together by fastening with a plurality of bolts (not shown). The first rack housing part 12 accommodates one axial end-side part of the rack bar 5, and the second rack housing part 13 accommodates another axial end-side part of the rack bar 5.

The rack bar accommodating portion 11 includes a first rack bar accommodating portion 14 and a second rack bar accommodating portion 15. The first rack bar accommodating portion 14 extends in an axial direction of the rack bar 5 inside the first rack housing part 12, and the second rack bar accommodating portion 15 extends in the axial direction of the rack bar 5 inside the second rack housing part 13.

Boots 16, each being formed in a bellows-like shape, are mounted to both axial ends of the rack housing 10 so as to partially cover the tie rods 9. The boots 16 are made of an elastic material such as a synthetic rubber material so as to ensure a predetermined level of flexibility. The boots 16 prevent intrusion of water or dust into the housing 3.

A steering assist mechanism 2 includes an electric motor 17, a transmission mechanism 18, various sensors, and a controller 19. The electric motor 17 is a drive unit that generates a steering assist force. The transmission mechanism 18 transmits a driving force of the electric motor 17 to the rack bar 5. The various sensors detect various state quantities of the power steering device. The controller 19 controls drive of the electric motor 17 based on, for example, signals output from the various sensors. In this case, the electric motor 17 and the transmission mechanism 18 form the turning actuator.

Among the various sensors, a steering angle sensor and a torque sensor are both accommodated in a housing 22. The steering angle sensor detects a steering angle, which is a rotation amount from a neutral steering angle of the steering wheel. The torque sensor detects a torque input to the steering shaft 4. The housing 22 is a part of the housing 3, and is formed so as to surround an outer periphery of the steering shaft 4.

The housing 22 that protects the sensors includes a sensor housing 21 and a sensor cover 20. The sensor housing 21 is provided to a part of the rack housing 10 that accommodates the rack bar 5. The sensor cover 20 is fixed to the sensor housing 21 with use of fixing bolts. The sensor cover 20 is formed of a flat plate having a predetermined thickness, and is formed in a disc-like shape.

The steering angle sensor accommodated in the housing 22 is mounted to an outer periphery of the input shaft 7 of the steering shaft 4, and detects a steering angle based on the rotation angle of the input shaft 7. Further, the steering angle sensor has a dual-system steering angle detecting portion, that is, a main steering angle detecting portion and a sub steering angle detecting portion. Each of the main steering angle detecting portion and the sub steering angle detecting portion detects the steering angle.

The torque sensor is also accommodated in the housing 22. The torque sensor is provided to cover a part of the input shaft 7 and a part of the output shaft 8, and detects a torque based on the amount of displacement of rotation of the input shaft 7 and the output shaft 8 relative to each other.

Further, the torque sensor includes a dual-system torque detecting portion, that is, a main torque detecting portion and a sub torque detecting portion. Each of the main torque detecting portion and the sub torque detecting portion detects a steering torque. The steering angle sensor and the torque sensor are electrically connected to the controller 19 through intermediation of a harness (not shown) provided along an outer periphery of the rack housing 10.

In FIG. 2, the electric motor 17 is a so-called three-phase AC motor, which is driven based on three-phase AC power. The electric motor 17 includes a motor housing 23 and motor elements. The motor housing 23 forms a part of the housing 3. The motor elements are provided inside the motor housing 23. The motor housing 23 has a tubular portion 23a, a first end wall portion 23b, and a second end wall portion 23c. The tubular portion 23a has a cylindrical shape, and accommodates the motor elements. The first end wall portion 23b and the second end wall portion 23c close opening portions of the tubular portion 23a, respectively.

The motor elements include a stator 26 having a tubular shape, a rotor 27 having a tubular shape, and a motor shaft 28. The stator 26 is fixed to an inner peripheral surface of the tubular portion 23a by, for example, shrink-fit. The rotor 27 is arranged on an inner peripheral side of the stator 26 with a predetermined radial gap therebetween. The motor shaft 28 is fixed to an inner peripheral side of the rotor 27 so as to be rotatable integrally with the rotor 27, and outputs rotation of the rotor 27.

The stator 26 is formed by winding U-phase, V-phase, and W-phase coils around a stator core (not shown) that is formed by laminating a plurality of thin plates. In this embodiment, the coils are connected together in a so-called Y-connection (star connection) configuration. However, the coils may be connected together in a delta connection configuration.

The motor shaft 28 has end portions 28a and 28b. Both of the end portions 28a and 28b are exposed from the motor housing 23 through through-holes formed to pass through the first end wall portion 23b and the second end wall portion 23c, respectively. One end portion 28a on a side opposite to the controller 19 is exposed inside a transmission mechanism accommodating portion 31 described later, which accommodates the transmission mechanism 18. Meanwhile, another end portion 28b is exposed inside an accommodating portion 43 described later, which accommodates the controller 19.

Further, the motor shaft 28 is rotatably supported by a first ball bearing 29 and a second ball bearing 30. The first ball bearing 29 is provided between an outer peripheral surface of the motor shaft 28 on the one end portion 28a side and an inner peripheral surface of the through hole of the first end wall portion 23b. The second ball bearing 30 is provided between an outer peripheral surface of the motor shaft 28 on the another end portion 28b side and an inner peripheral surface of the through-hole of the second end wall portion 23c.

The transmission mechanism 18 is accommodated in the transmission mechanism accommodating portion 31 (corresponding to "speed reducer accommodating space" in the claims) of the housing 3. The transmission mechanism 18 includes an input-side pulley 32, an output-side pulley 33, a belt 34, and a ball screw mechanism 35. The belt 34 is looped around both of the pulleys 32 and 33. The ball screw mechanism 35 converts rotation of the output-side pulley 33 into a motion of the rack bar 5 in the axial direction while reducing a speed of the rotation of the output-side pulley 33.

The transmission mechanism accommodating portion 31 is formed by joining a first transmission mechanism accommodating portion 36 and a second transmission mechanism accommodating portion 37 together. The first transmission mechanism accommodating portion 36 is located at an end of the first rack bar accommodating portion 14 on the second rack housing part 13 side. The second transmission mechanism accommodating portion 37 is located at an end of the second rack bar accommodating portion 15 on the first rack housing part 12 side.

The input-side pulley 32 is formed in a cylindrical shape having a diameter relatively smaller than a diameter of the output-side pulley 33. The one end portion 28a of the motor shaft 28 of the electric motor 17 is press-fitted into and fixed to the input-side pulley 32 through a through-hole formed on an inner peripheral side of the input-side pulley 32 to pass through the input-side pulley 32.

The output-side pulley 33 is arranged on an outer peripheral side of the rack bar 5, and is linked with the rack bar 5 through intermediation of the ball screw mechanism 35. More specifically, the output-side pulley 33 has a bottomed cylindrical shape with a diameter relatively larger than a diameter of the input-side pulley 32. The output-side pulley 33 is fixed to an outer periphery of a turning nut 38 of the ball screw mechanism 35, which is described later, and rotates integrally with the turning nut 38.

The belt 34 is an endless belt including, for example, glass fiber or a steel wire, which is embedded therein as a core. The belt 34 rotates the input-side pulley 32 and the output-side pulley 33 in synchronization with each other to transmit a rotating force of the input-side pulley 32 to the output-side pulley 33.

The ball screw mechanism 35 includes the turning nut 38 (corresponding to "nut main body" in the claims), a ball circulation groove 39, a plurality of balls 40, and a circulation mechanism (not shown). The turning nut 38 has a tubular shape, and is arranged so as to be threadably engaged with an outer peripheral side of the rack bar 5. The ball circulation groove 39 is formed between the turning nut 38 and the rack bar 5. The plurality of balls 40 are rollably provided in the ball circulation groove 39. The circulation mechanism circulates the balls 40 from one end to another end of the ball circulation groove 39.

The turning nut 38 is rotatably supported through intermediation of a ball bearing 41 accommodated in the first transmission mechanism accommodating portion 36. The ball bearing 41 includes an inner race (inner race portion) 41a, an outer race main body (outer race portion) 41b, and a plurality of balls 41c. The inner race 41a is formed integrally with the turning nut 38. The outer race main body 41b is fixed to an inner peripheral surface defining the first transmission mechanism accommodating portion 36. The plurality of balls 41c are rollably accommodated in a space between the inner race 41a and the outer race main body 41b. In this embodiment, the inner race 41a formed integrally with the turning nut 38 is exemplified. However, the inner race 41a and the turning nut 38 can also be formed separately.

The ball circulation groove 39 includes a shaft-side ball screw groove 39a (corresponding to "turning shaft ball screw groove" in the claims) and a nut-side ball screw groove 39b (corresponding to "nut ball screw groove" in the claims). The shaft-side ball screw groove 39a is formed on an outer peripheral side of the rack bar 5, and has a helical groove shape. The nut-side ball screw groove 39b is formed on an inner peripheral side of the turning nut 38, and has a helical groove shape.

The controller 19 includes a controller housing 42 and a control board 44. The controller housing 42 forms a part of the housing 3. The control board 44 is accommodated in the accommodating portion 43 of the controller housing 42.

The controller housing 42 includes a body 45 and a cover 46. The body 45 has a tubular shape, and has one end on the electric motor 17 side, which covers an outer periphery of the motor housing 23. The cover 46 closes an opening portion at another end of the body 45.

The control board 44 includes a substrate made of a non-conductive resin material as represented by a glass epoxy resin, conductor patterns formed on a front surface and a back surface of the substrate, and a large number of electronic components and electrical components mounted on the conductive patterns.

Although not shown in FIG. 2, a motor rotation angle sensor is provided on the control board 44. The motor rotation angle sensor is one of the various sensors, and detects a motor rotation angle, which is a rotation angle of the rotor 27 of the electric motor 17.

The motor rotation angle sensor detects a rotation angle of the motor shaft 28 (rotor 27) based on a change in magnetic field generated by a magnet (not shown) mounted to the another end 28b of the motor shaft 28. Further, the motor rotation angle sensor includes a dual-system motor rotation angle detecting portion, that is, a main rotation angle detecting portion and a sub motor rotation angle detecting portion. Each of the main rotation angle detecting portion and the sub motor rotation angle detecting portion detects the rotation angle of the motor shaft 28.

The configuration of the electric power steering device that assists steering of the steering shaft has been described above. A steer-by-wire steering device has substantially the same configuration except that the steering shaft is not coupled to the rack bar 5.

Next, details of the transmission mechanism accommodating portion 31 that accommodates the turning nut 38 and the ball bearing 41 are described with reference to FIG. 3 and FIG. 4.

Figure 3:
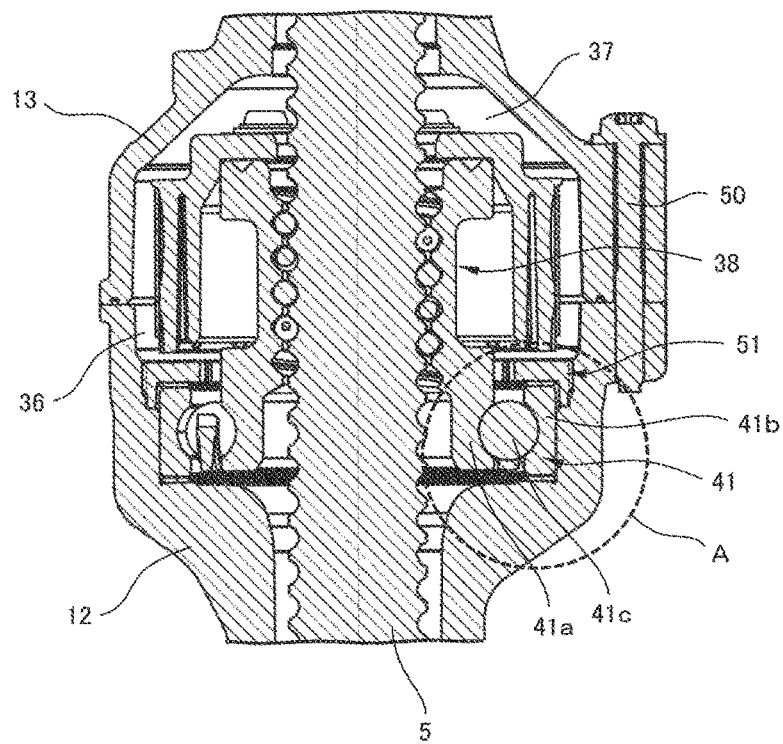
FIG. 3 is an enlarged sectional view of a turning nut and a rack housing around the turning nut.

FIG. 3 is an enlarged view of the turning nut 38, the ball bearing 41 that rotatably holds the turning nut 38, and the vicinity thereof. FIG. 4 is an enlarged view of the ball bearing 41, a lock nut, and the vicinity thereof in FIG. 3. In FIG. 3 and FIG. 4, the rack bar is illustrated in a state of extending in an up-and-down direction.

In FIG. 3, the first rack housing part 12 includes the first transmission mechanism accommodating portion 36, and the second rack housing part 13 includes the second transmission mechanism accommodating portion 37. The first rack housing part 12 and the second rack housing part 13 are brought into contact with each other so that the first transmission mechanism accommodating portion 36 and the second transmission mechanism accommodating portion 37 communicate with each other, and are fixed with use of a bolt 50. As a result, the accommodating space (corresponding to "speed reducer accommodating space" in the claims) having a predetermined capacity is formed.

The turning nut 38, the ball bearing 41, and a lock nut 51 are accommodated in the accommodating space. The ball bearing 41 including the inner race 41a, the balls 41c, and the outer race main body 41b is mounted on a radially outer periphery of the turning nut 38. The inner race 41a is formed directly on the outer periphery of the turning nut 38.

Figure 4:
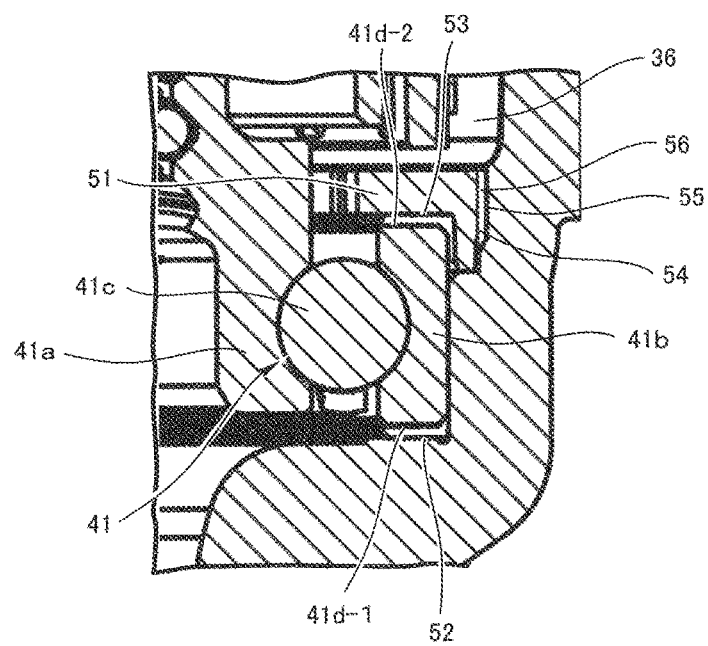
FIG. 4 is an enlarged sectional view of a main part including a portion A of FIG. 3.

Further, in FIG. 4, the inner race 41a of the ball bearing 41 and one side end surface 41d-1 of the outer race main body 41b in the axial direction (axial direction of the rack bar 5) are in contact with a radial-direction end surface portion 52 (corresponding to "outer race abutting portion" in the claims) of an inner wall portion that defines the first transmission mechanism accommodating portion 36. Further, another side end surface 41d-2 of the outer race main body 41b of the ball bearing 41 in the axial direction (axial direction of the rack bar 5) is pressed in the axial direction toward the radial-direction end surface portion 52 by an outer race contact surface 53 of the lock nut 51, which is located on its inner side.

An "axis" of the axial direction described above refers to an axis of the rack bar 5 unless otherwise noted. Axes of the turning nut 38, the ball bearing 41, and the lock nut 51, which are located coaxially with the rack bar 5 on its the outer periphery, are regarded as being common to the axis of the rack bar 5. Thus, when it is described below merely as the "axis", the "axis" refers to the axis of the rack bar 5.

The lock nut 51 has a male thread portion 54 (corresponding to "lock nut fastening male thread portion" in the claims) on its outer periphery. The male thread portion 54 is threadably engaged with a female thread portion (corresponding to "lock nut fastening female thread portion" in the claims) 56 of an axial-direction peripheral surface portion 55 of the inner wall portion that defines the first transmission mechanism accommodating portion 36. Thus, when the lock nut 51 is fastened, the ball bearing 41 is fixed by the lock nut 51 inside the first transmission mechanism accommodating portion 36.

Figure 14:
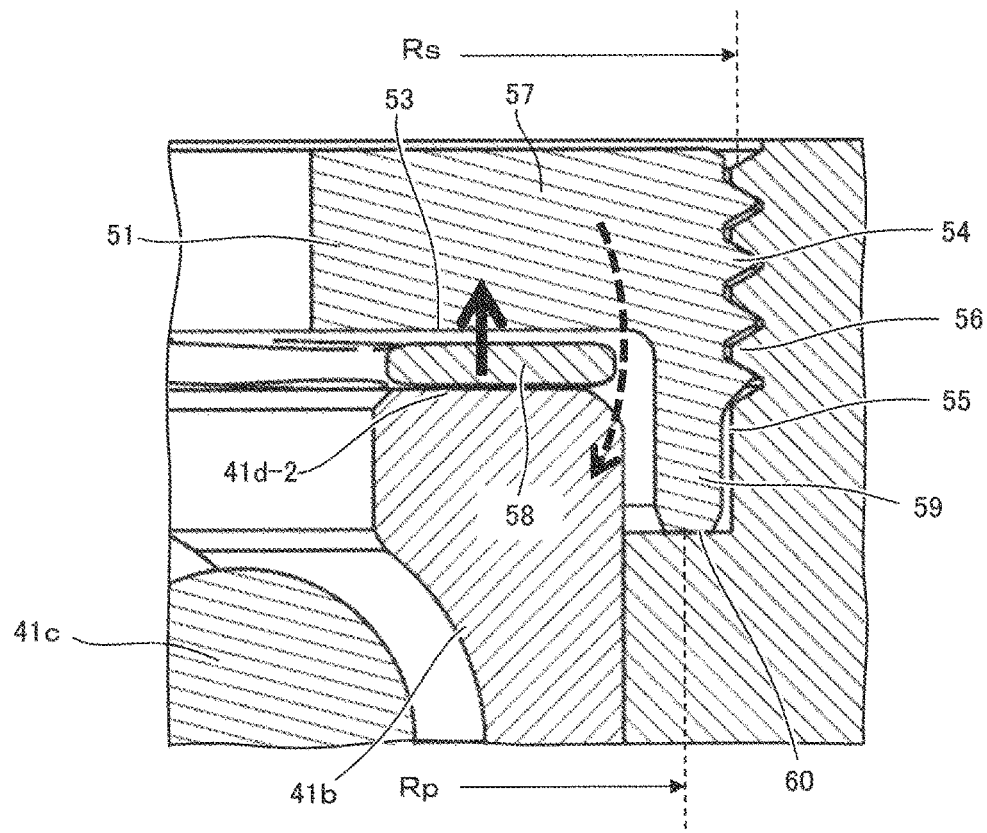
FIG. 14 is an enlarged sectional view of a main part including a lock nut and an outer race of a related-art steering device.

Next, a relationship in arrangement between a related-art lock nut 51 and the outer race main body 41b and a reason why loosening of the lock nut 51 occurs are described. FIG. 14 is an enlarged view of the lock nut 51, the outer race main body 41b, and the vicinity thereof of a related-art steering device.

In FIG. 14, the lock nut 51 includes a lock nut main body 57 extending in a radial direction orthogonal to the axis of the lock nut 51 (common to the axis of the rack bar 5). The lock nut main body 57 has the outer race contact surface 53 on a side closer to the outer race main body 41b. The ball bearing 41 is arranged so that the another side end surface 41d-2 of the outer race main body 41b of the ball bearing 41 in the axial direction faces the outer race contact surface 53 described above.

A wave washer 58 is provided between the another side end surface 41d-2 of the outer race main body 41b and the outer race contact surface 53 of the lock nut 51. The wave washer 58 has a function of pressing the ball bearing 41 toward the radial-direction end surface portion 52 (see FIG. 4) defining the first transmission mechanism accommodating portion 36 when the lock nut 51 is fastened.

The lock nut main body 57 has the lock nut fastening thread portion 54 on its outer periphery. The lock nut fastening thread portion 54 is threadably engaged with the lock nut fastening female thread portion 56 of the axial-direction peripheral surface portion 55 defining the first transmission mechanism accommodating portion 36. When the lock nut 51 is fastened, the ball bearing 41 is pressed toward the radial-direction end surface portion 52 defining the first transmission mechanism accommodating portion 36 through the wave washer 58.

Further, a loosening prevention protruding portion 59 is formed on the lock nut main body 57 so as to be located on a distal end side of the lock nut fastening male thread portion 54. The loosening prevention protruding portion 59 is in contact with a radial-direction abutting portion (corresponding to "lock nut abutting portion" in the claims) 60 of the inner wall portion defining the first transmission mechanism accommodating portion 36. The radial-direction abutting portion 60 is located on a radially outer side of the outer race main body 41b. Loosening of the lock nut 51 is prevented with a frictional force generated between contact surfaces of the loosening prevention protruding portion 59 and the radial-direction abutting portion 60.

A radius (Rs) of the lock nut fastening male thread portion 54 of the lock nut main body 57 is set to be larger than a radius (Rp) of the loosening prevention protruding portion 59. Under a state in which the lock nut 51 is fastened, an impulsive external force may act in the axial direction on the outer race contact surface 53 of the lock nut 51 from the ball bearing 41 side in some cases. For example, a tire receives impact from a road surface while running thereon. The impact is transmitted to the turning nut 38 via the rack bar 5. The outer race main body 41b of the ball bearing 41 fixed to the turning nut 38 is brought into contact with the outer race contact surface 53 of the lock nut 51 with the wave washer 58 therebetween. The impact acts on the outer race contact surface 53 of the lock nut 51 as an external force in the axial direction, as indicated by an arrow in solid line.

Figure 15:
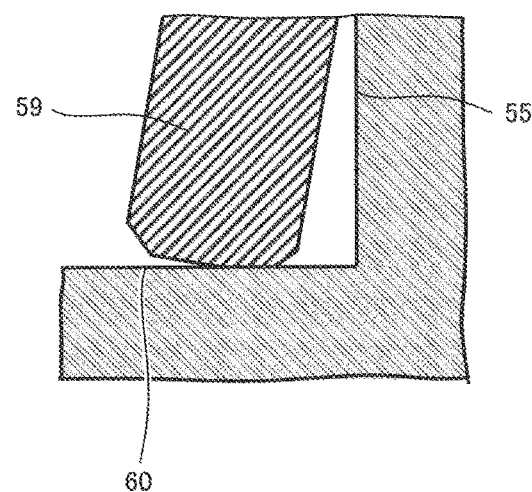
FIG. 15 is an enlarged sectional view of a main part including a related-art loosening prevention protruding portion and a related-art radial-direction abutting portion when an external force acts.

Thus, as illustrated in FIG. 14, a rotational motion (rocking motion) of the lock nut 51 occurs mainly in the vicinity of an outer peripheral side of the lock nut fastening male thread portion 54 of the lock nut 51, as indicated by an arrow in broken line. When the loosening prevention protruding portion 59 inclines due to the rotational motion, there occurs a phenomenon that a contact area between the loosening prevention protruding portion 59 and the radial-direction abutting portion 60 being in contact therewith is reduced to decrease a frictional force, as illustrated in FIG. 15. Thus, the frictional force for fixing the lock nut 51 is decreased, resulting in a problem of loosening of the lock nut 51.

A special loosening prevention mechanism may be provided to prevent the loosening. However, extra components are needed or the number of assembly steps increases, leading to a problem of a significant increase in price of the steering device.

Example 1

The present invention proposes a novel steering device capable of dealing with the problems described above. The steering device has a representative structure as follows.

The present invention has an object to provide a steering device including a rack bar and a turning nut. The rack bar is accommodated in the accommodating space of the rack housing, and is one turning shaft coupled to the steered wheels. The turning nut is threadably engaged with the rack bar, and is rotated by the electric motor.

The outer race of the ball bearing mounted to the turning nut is mounted to the wall surface defining the accommodating space. Further, the outer race is pressed in the axial direction of the rack bar by the lock nut against the wall surface, and is fixed thereto. The loosening prevention protruding portion formed on the lock nut main body of the lock nut is brought into contact with the abutting portion of the wall surface. The loosening of the lock nut is prevented with the frictional force generated between the loosening prevention protruding portion and the abutting portion. Further, the loosening prevention protruding portion or the lock nut main body has a stiffness reducing portion that reduces mechanical stiffness. An external force acting from the outer race is buffered by the stiffness reducing portion to restrict inclination of the loosening prevention protruding portion to thereby reduce a decrease in contact area between the loosening prevention protruding portion and the radial-direction abutting portion.

Figure 5:
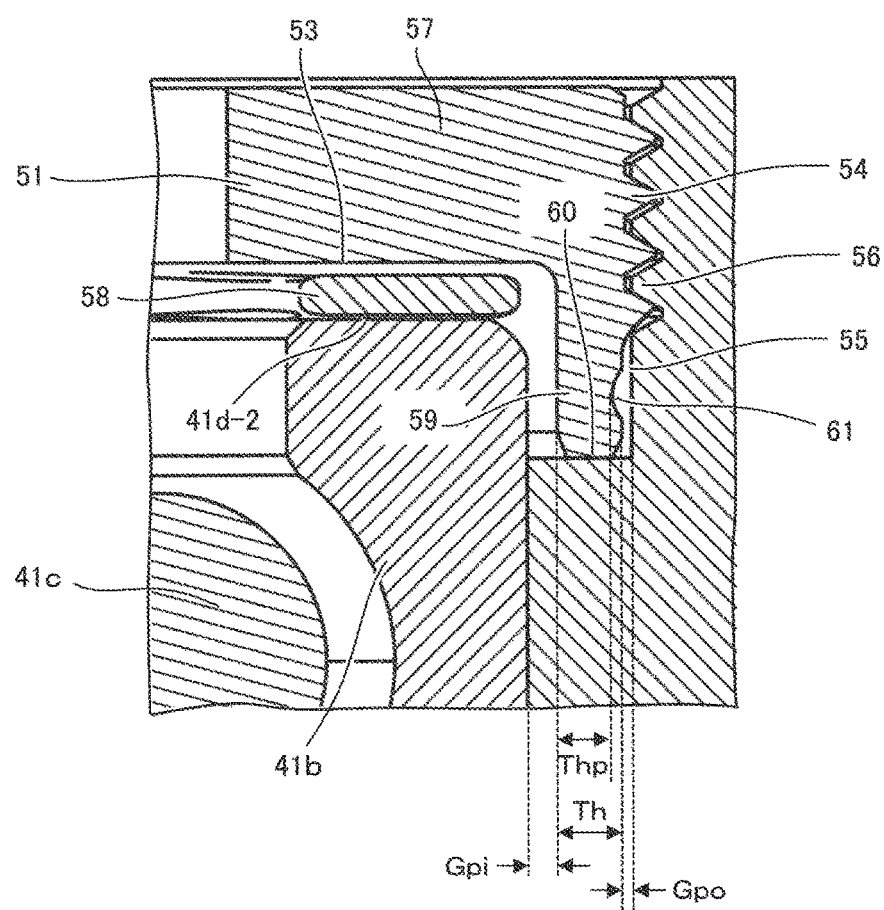
FIG. 5 is an enlarged sectional view of a main part including a lock nut and an outer race of a steering device according to a first embodiment of the present invention.

Now, a first embodiment of the present invention is described. FIG. 5 is an enlarged view of the lock nut 51, the outer race main body 41*b*, and the vicinity thereof according to the first embodiment of the present invention.

In FIG. 5, the radial-direction abutting portion 60 defining the first transmission mechanism accommodating portion 36 is located on an outside of the outer race main body 41*b* in a direction orthogonal to the axis of the ball bearing 41 (common to the axis of the rack bar). Further, the axial-direction peripheral surface portion 55, which extends in parallel to the axis of the ball bearing 41 and defines the first transmission mechanism accommodating portion 36, is located on an outer peripheral side of the radial-direction abutting portion 60.

The lock nut 51 includes the lock nut main body 57 extending in the radial direction orthogonal to the axis of the lock nut 51 (common to the axis of the rack bar 5). The lock nut main body 57 has the outer race contact surface 53 on the outer race main body 41*b* side. The outer race contact surface 53 is brought into contact with the outer race main body 41*b* with the wave washer 58 therebetween.

The outer race contact surface 53 is formed to extend in the radial direction orthogonal to the axis of the lock nut 51. Further, the ball bearing 41 is arranged so that the another side end surface 41*d*-2 of the outer race main body 41*b* of the ball bearing 41 in the axial direction faces the outer race contact surface 53 described above.

The wave washer 58 is elastically provided between the side end surface 41*d*-2 of the outer race main body 41*b* of the ball bearing 41 and the outer race contact surface 53, and presses the outer race main body 41*b* from the outer race contact surface 53 side toward the radial-direction end surface portion 52 defining the first transmission mechanism accommodating portion 36. At the same time, the wave washer 58 presses the outer race contact surface 53 from the outer race main body 41*b* side in a direction in which the lock nut 51 moves away from the outer race.

The lock nut 51 has the lock nut fastening male thread portion 54 on the outer periphery. The lock nut fastening male thread portion 54 is threadably engaged with the lock nut fastening female thread portion 56 of the axial-direction peripheral surface portion 55 defining the first transmission mechanism accommodating portion 36. When the lock nut 51 is fastened, the ball bearing 41 is pressed against the radial-direction end surface portion 52 (see FIG. 4) defining the first transmission mechanism accommodating portion 36 with the wave washer 58 therebetween.

The loosening prevention protruding portion 59 is formed on a surface of the lock nut main body portion 57 on the outer race main body 41*b* side (on a distal end side with respect to the lock nut fastening male thread portion 54). The loosening prevention protruding portion 59 is in parallel to the axis of the ball bearing 41 (common to the axis of the rack bar) and extends in a direction perpendicular to the outer race contact surface 53, and is located between the axis-direction peripheral surface portion 55 defining the first transmission mechanism accommodating portion 36 and an outer peripheral surface of the outer race main body 41*b* with predetermined gaps Gpi and Gpo, respectively.

A distal end of the loosening prevention protruding portion 59 is in contact with the radial-direction abutting portion 60 defining the first transmission mechanism accommodating portion 36. Loosening of the lock nut 51 is prevented with a frictional force generated between the loosening prevention protruding portion 59 and the radial-direction abutting portion 60.

Further, the loosening prevention protruding portion 59 has an outer peripheral-side lock nut recessed portion 61 functioning as a stiffness reducing portion (or an external force buffering portion) on its outer periphery. The outer peripheral-side lock nut recessed portion 61 is formed at a predetermined position between an end surface of the thread portion 54 of the lock nut 51 and the distal end of the loosening prevention protruding portion 59, and is formed on the outer periphery of the loosening prevention protruding portion 59 as an annular groove. Thus, the outer peripheral-side lock nut recessed portion 61 is formed as an annular groove being open in the radial direction orthogonal to the axis of the lock nut 51.

For example, the outer peripheral-side lock nut recessed portion 61 is formed at a predetermined position on an entire length of the loosening prevention protruding portion 59 in the axial direction, which is defined as a length between the end surface of the thread portion 54 on the radial-direction abutting portion 60 side and a distal end surface of the loosening prevention protruding portion 59. The predetermined position is separate from the end surface of the radial-direction abutting portion 60. For example, in this embodiment, the outer peripheral-side lock nut recessed portion 61 is formed at a position in the vicinity of a middle point (about half a distance away from the distal end) between the end surface of the lock nut fastening male thread portion 54 on the radial-direction abutting portion 60 side and the distal end surface of the loosening prevention protruding portion 59.

As described above, the distal end surface of the loosening prevention protruding portion 59 is in contact with the radial-direction abutting portion 60. Contact surfaces of the loosening prevention protruding portion 59 and the radial-direction abutting portion 60 generate a frictional force. Thus, when the outer peripheral-side lock nut recessed portion 61 is not formed on the contact surfaces, a decrease in area of the contact surfaces that generate a frictional force can be reduced to reduce a decrease in fastening force for the lock nut 51. A corner (inner peripheral-side edge or outer peripheral-side edge) of the distal end of the loosening prevention protruding portion 59, which has a slightly reduced contact area through, for example, chamfering or rounding, falls within the scope of this embodiment.

Further, a thickness (Thp) of a part of the loosening prevention protruding portion 59 in the radial direction, which has the annular groove functioning as the outer peripheral-side lock nut recessed portion 61, is set to have a relationship of "Th/2<Thp<Th" with respect to a thickness (Th) of the loosening prevention protruding portion 59 in the radial direction.

In other words, the thickness (Thp) of the part of the loosening prevention protruding portion 59, which has the outer peripheral-side lock nut recessed portion 61, in the radial direction orthogonal to the axis of the lock nut, is smaller than the thickness of a region of the loosening prevention protruding portion 59, which is adjacent to the outer peripheral-side lock nut recessed portion 61.

As described above, the outer peripheral-side lock nut recessed portion 61 of the loosing prevention protruding portion 59 of the lock nut 51 locally reduces mechanical stiffness, that is, in the vicinity of the outer peripheral-side lock nut recessed portion 61. Then, when an external force in the axial direction as indicated in FIG. 14 is applied to the outer race contact surface 53 of the lock nut main body 57 by the outer race main body 41b of the ball bearing 41, the lock nut main body 57 displaces to open outward in a direction away from the outer race main body 41b about a point on an outer peripheral side of the lock nut fastening male thread portion 54 formed on the outer peripheral side of the lock nut main body 57 as a fulcrum.

At this time, even when the lock nut main body 57 displaces in a direction away from the outer race main body 41b, the external force from the outer race 41 is buffered through deflection (elastic deformation) of the loosening prevention protruding portion 59 at the outer peripheral-side lock nut recessed portion 61 of the loosening prevention protruding portion 59. As a result, transmission of the external force from the outer race main body 41b to the distal end of the loosening prevention protruding portion 59 is prevented.

This reduces or prevents inclination of the distal end surface of the loosening prevention protruding portion 59 with respect to a surface of the radial-direction abutting portion 60, which is illustrated in FIG. 15. A sufficient contact area can be maintained between the loosening prevention protruding portion 59 and the radical-direction abutting portion 60, reducing a decrease in frictional force generated between the loosening prevention protruding portion 59 and the radial-direction abutting portion 60.

Further, the lock nut main body 57 has a cantilever structure with the lock nut fastening male thread portion 54 as a fixed point, and a large external force is applied from the outer race main body 41b. Thus, a thickness of the lock nut main body 57 is required to be ensured as large as possible.

Thus, the outer peripheral-side lock nut recessed portion 61 is formed not in the lock nut main body 57 but in the loosening prevention protruding portion 59. As a result, a reduction in thickness of the lock nut main body 57 can be prevented.

In this case, as described above, the thickness (Th) of the region of the loosing prevention protruding portion 59, which is adjacent to the outer peripheral-side lock nut recessed portion 61, is determined to be larger than the thickness (Thp) of the outer peripheral-side lock nut recessed portion 61. The thus determined thicknesses provide the following actions and effects.

When an external force in the axial direction acts on the lock nut main body portion 57 from the outer race main body 41b, the distal end of the loosening prevention protruding portion 59 is subjected to a force for rocking the distal end of the loosening prevention protruding portion 59 in a radially inward direction toward the outer peripheral side of the outer race main body 41b about a point on the outer peripheral side of the lock nut fastening male thread portion 54 of the lock nut main body 57 as a pivot fulcrum.

The outer peripheral-side lock nut recessed portion 61 is formed on the outer peripheral side of the loosening prevention protruding portion 59. Thus, an inner peripheral portion corresponding to the outer peripheral-side lock nut recessed portion 61 is subjected to the force. The inner peripheral portion corresponding to the outer peripheral-side lock nut recessed portion 61 is located farther from the pivot fulcrum than the outer peripheral-side lock nut recessed portion 61.

Thus, assuming that the same external force acts on the lock nut main body portion 57, a larger deflection amount can be obtained in a case in which the outer peripheral-side lock nut recessed portion 61 is formed on the outer peripheral side of the loosening prevention protruding portion 59 than in a case in which the outer peripheral-side lock nut recessed portion 61 is formed on an inner peripheral side of the loosening prevention protruding portion 59.

Thus, even when the amount of recess of the outer peripheral-side lock nut recessed portion 61 is small, a sufficient amount of deflection of the loosening prevention protruding portion 59 can be obtained. Thus, a decrease in thickness of the loosening prevention protruding portion 59 can be reduced. As a result, deformation of the loosening prevention protruding portion 59 can be reduced, and a sufficient tightening force for the lock nut 51 can be obtained.

As described above, in this embodiment, the outer peripheral-side lock nut recessed portion 61 formed on the loosening prevention protruding portion 59 of the lock nut 51 locally reduces mechanical stiffness in the vicinity of the outer peripheral-side lock nut recessed portion 61. Thus, when the external force in the axial direction is applied to the outer race contact surface 53 of the lock nut main body 57 from the outer race main body 41b of the ball bearing 41 and the lock nut main body 57 displaces in a direction away from the outer race main body 41b about the point on the outer peripheral side of the thread portion 54 formed on the outer peripheral side of the lock nut main body 57 as a fulcrum, the external force from the outer race 41 is buffered through the deflection of the loosening prevention protruding portion 59 at the outer peripheral-side lock nut recessed portion 61, preventing transmission of the external force from the outer race 41 to the distal end of the loosening prevention protruding portion 59.

Thus, a problem of a decrease in frictional force for fixing the lock nut 51, which results in loosening of the lock nut 51, can be coped with. Further, the problem can be coped with by simply forming the lock nut recessed portion 61 having an annular shape in the outer peripheral surface of the loosening prevention protruding portion 59 without providing a special loosening prevention mechanism. Thus, extra components are not needed or the number of assembly steps does not increase, thereby preventing a significant increase in price of the steering device.

In the first embodiment illustrated in FIG. 5, an annular continuous groove has been proposed as the outer peripheral-side lock nut recessed portion 61. In short, the loosening prevention protruding portion 59 is only required to have a portion deflectable under an external force. The outer peripheral-side lock nut recessed portion 61 is not necessarily required to have a continuous groove shape, but may be recessed portions formed at predetermined intervals to form an annular shape as a whole.

Figure 6:
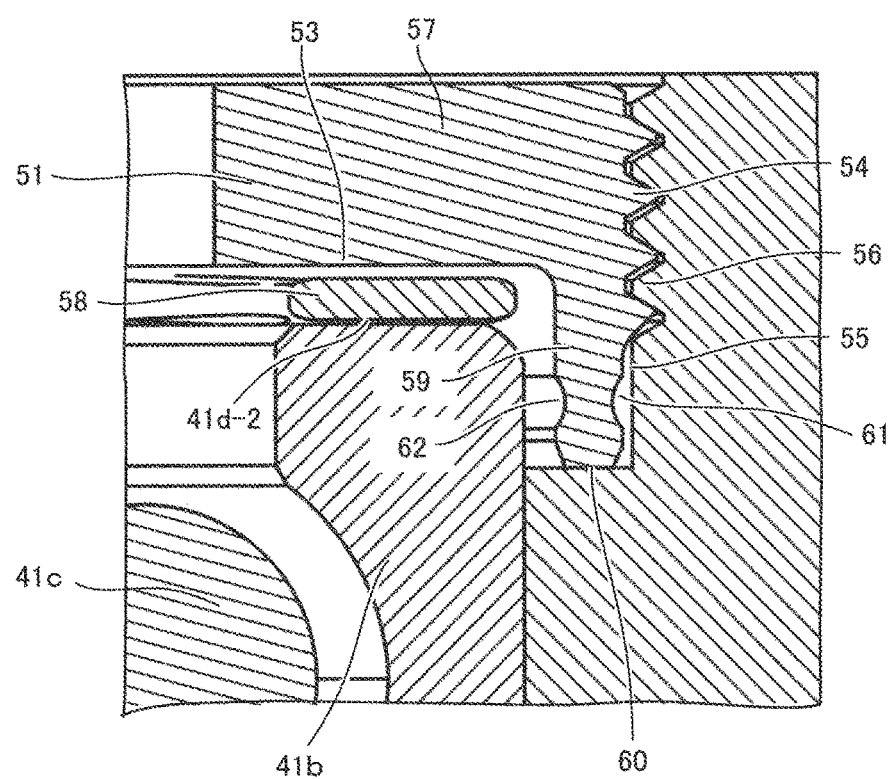
FIG. 6 is an enlarged sectional view of a main part including a lock nut and an outer race of a steering device of a modification example of the first embodiment.

In this case, in the first embodiment, the outer peripheral-side lock nut recessed portion 61 formed in the outer peripheral surface of the loosening prevention protruding portion 59 of the lock nut 51 has been described. As illustrated in FIG. 6, however, lock nut recessed portions may be formed in both of the outer peripheral surface and an inner peripheral surface of the loosening prevention protruding portion 59 of the lock nut 51. In FIG. 6, there is illustrated a modification example in which lock nut recessed portions are formed in both of the outer peripheral surface and the inner peripheral surface of the loosening prevention protruding portion 59 of the lock nut 51.

In FIG. 6, an inner peripheral-side lock nut recessed portion 62 may be formed at the same position in the inner peripheral surface of the loosening prevention protruding portion 59 as the position of the outer peripheral-side lock nut recessed portion 61 formed in the outer peripheral surface of the loosening prevention protruding portion 59 of the lock nut 51, that is, at a position in the vicinity of a middle point (about half a distance away from the distal end) between the end surface of the lock nut fastening male thread portion 54 on the radial-direction abutting portion 60 and the distal end surface of the loosening prevention protruding portion 59. In some cases, the outer peripheral-side lock nut recessed portion 61 and the inner peripheral-side lock nut recessed portion 62 may be formed not at the same position but also at different positions. Further, only any one of the outer peripheral-side lock nut recessed portion 61 and the inner peripheral-side lock nut recessed portion 62 may be formed.

As described above, the lock nut recessed portion 61, 62 is an annular groove formed in the outer peripheral surface, the inner peripheral surface, or both of the peripheral surfaces of the loosening prevention protruding portion 59, which is open in the radial direction orthogonal to the axis of the lock nut 51. Thus, the lock nut recessed portion can easily be formed.

In the embodiment illustrated in FIG. 5 and FIG. 6, the displacement of the lock nut main body 57, which may occur under the external force from the outer race main body 41b, is buffered through the deflection at the outer peripheral-side lock nut recessed portion 61 or the inner peripheral-side lock nut recessed portion 62. In any case, it is apparent that damage to the outer peripheral-side lock nut recessed portion 61 or the inner peripheral-side lock nut recessed portion 62 does not occur, and the deflection falls within a range of elastic deformation.

Example 2

Next, a second embodiment of the present invention is described. In the first embodiment, the lock nut recessed portion 61, 62 is formed in the outer peripheral surface, the inner peripheral surface, or both of the peripheral surfaces of the loosening prevention protruding portion 59. In the second embodiment, a lock nut recessed portion is formed at a connecting portion between a loosening prevention protruding portion 59 and a lock nut main body 57.

Figure 7:
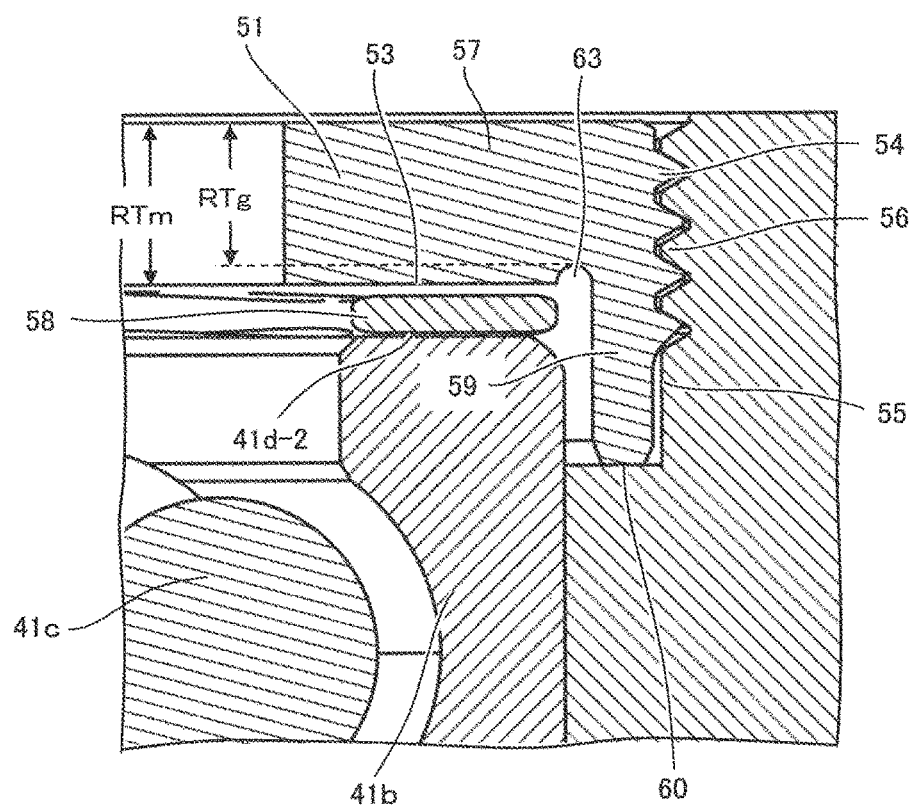
FIG. 7 is an enlarged sectional view of a main part including a lock nut and an outer race of a steering device according to a second embodiment of the present invention.

In FIG. 7, as in the first embodiment, a loosening prevention protruding portion 59 extending from the outer race contact surface 53 in a direction perpendicular to an outer race contact surface 53 is formed on an outer peripheral side of the outer race contact surface 53 of the lock nut main body 57. The loosening prevention protruding portion 59 does not have the outer peripheral-side lock nut recessed portion 61 or the inner peripheral-side lock nut recessed portion 62 in its outer peripheral surface or its inner peripheral surface.

In place of the outer peripheral-side lock nut recessed portion 61 or the inner peripheral-side lock nut recessed portion 62, a root-side lock nut recessed portion 63 functioning as a stiffness reducing portion (or external force buffering portion) is formed at a joint portion between the outer race contact surface 53 and the loosening prevention protruding portion 59. The root-side lock nut recessed portion 63 is formed on an inner peripheral side of the joint portion between the outer race contact surface 53 and the loosening prevention protruding portion 59, and is formed to extend inwardly from the outer race contact surface 53 into the lock nut main body 57.

Specifically, a thickness (RTg) of a part of a lock nut 51 in the axial direction, which has the root-side lock nut recessed portion 63, is set to be smaller than a thickness (RTm) of a region adjacent to the root-side lock nut recessed portion 63. Further, the root-side lock nut recessed portion 63 is formed as an annular groove on the inner peripheral side of the joint portion between the outer race contact surface 53 and the loosening prevention protruding portion 59. The groove is open toward the outer race main body 41b in the axial direction of the lock nut 51.

As described above, the root-side lock nut recessed portion 63 is formed in the connecting portion between the outer race contact surface 53 and the loosening prevention protruding portion 59 of the lock nut 51. As a result, mechanical stiffness in the vicinity of the root-side lock nut recessed portion 63 is locally reduced. Then, when an external force in the axial direction as illustrated in FIG. 14 is applied to the outer race contact surface 53 of the lock nut main body 57 from the outer race main body 41b of the ball bearing 41, the lock nut main body 57 displaces to open outward in a direction away from the outer race main body 41b about a point on an outer peripheral side of the thread portion 54 formed on the outer peripheral side of the lock nut main body 57 as a fulcrum.

In this case, even when the lock nut main body 57 displaces in a direction away from the outer race main body 41b, the external force applied from the outer race 41 is buffered through deflection (elastic deformation) at the root-side lock nut recessed portion 63 formed in the connecting portion between the outer race contact surface 53 and the loosening prevention protruding portion 59, preventing transmission of the external force from the outer race 41 to the distal end of the loosening prevention protruding portion 59.

In this manner, inclination of a distal end surface of the loosening prevention protruding portion 59 with respect to a surface of the radial-direction abutting portion 60 is reduced, allowing a sufficient contact area between the loosening prevention protruding portion 59 and the radial-direction abutting portion 60 to be maintained. As a result, a decrease in frictional force generated between the loosening prevention protruding portion 59 and the radial-direction abutting portion 60 is reduced.

In the embodiment illustrated in FIG. 7, the displacement of the lock nut main body 57, which is caused when the external force from the outer race main body 41*b* acts, is buffered through the deflection that occurs at the root-side lock nut recessed portion 63. Also in this case, it is apparent that damage to the root-side lock nut recessed portion 63 does not occur and the deflection falls within a range of elastic deformation.

Example 3

Next, a third embodiment of the present invention is described. The first embodiment or the second embodiment described above has proposed a structure in which the external force generated due to the inclination of the lock nut main body 57 is buffered by the lock nut recessed portion 61, 62, 63. Meanwhile, the third embodiment proposes a structure in which inclination itself of a lock nut main body 57 is reduced.

This embodiment assumes a lock nut 51 having any one of the lock nut recessed portions 61, 62, and 63 according to the first embodiment or the second embodiment. In this case, however, the lock nut 51 having the outer peripheral-side lock nut recessed portion 61 is described.

Figure 8:
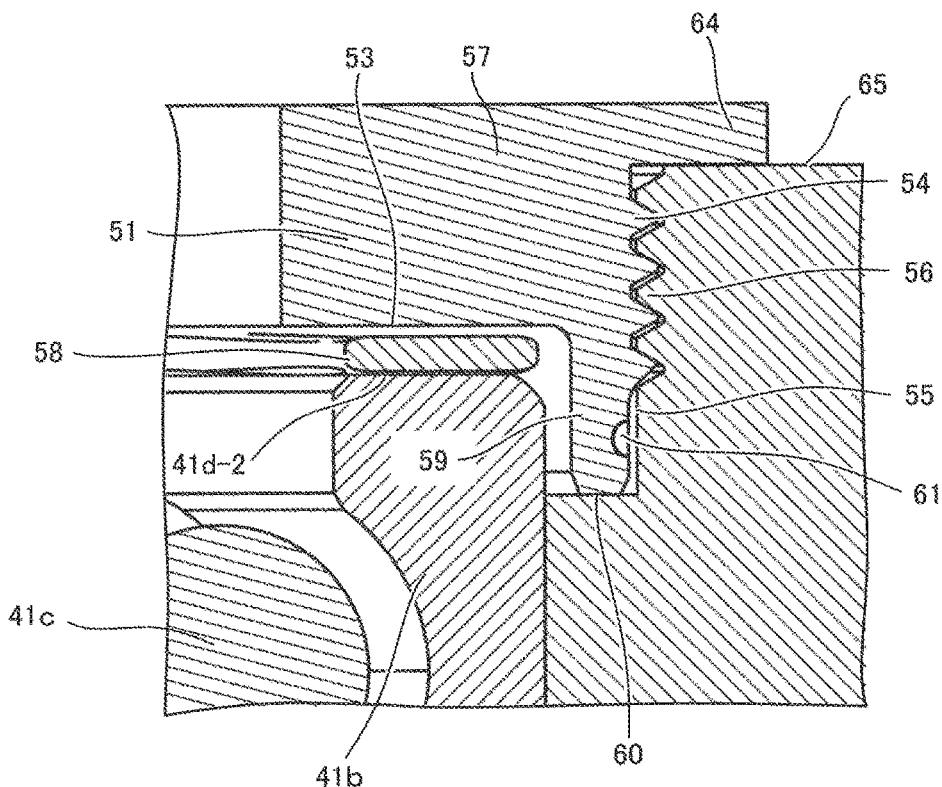
FIG. 8 is an enlarged sectional view of a main part including a lock nut and an outer race of a steering device according to a third embodiment of the present invention.
Figure 9:
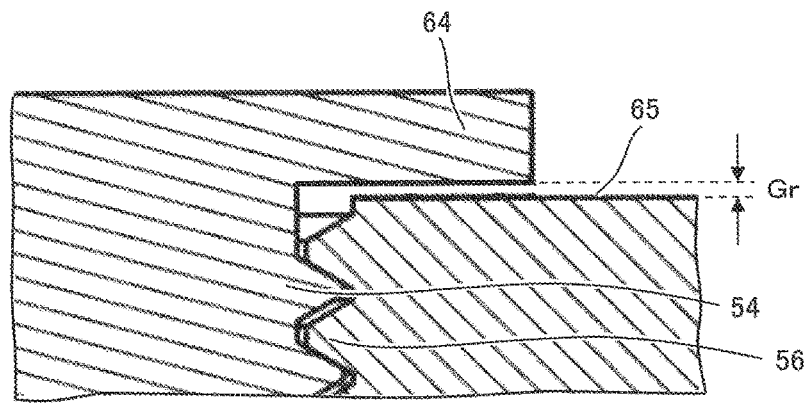
FIG. 9 is an enlarged sectional view of a main part including a projecting portion of FIG. 8.

In FIG. 8 and FIG. 9, a lock nut main body 57 has a projecting portion 64 having an annular shape on its outer peripheral side. The projecting portion 64 extends outward beyond a lock nut fastening male thread portion 54 in a radial direction orthogonal to an axis of the lock nut 51. The projecting portion 64 can be brought into contact with a radial-direction flat surface portion 65 (corresponding to "outer peripheral surface of an opening edge of a lock nut fastening female thread portion" in the claims) formed to extend outward in a direction perpendicular to an axial-direction peripheral surface portion 55 defining a first transmission mechanism accommodating portion 36.

The radial-direction flat surface portion 65 is the same flat surface as the opening edge of the lock nut fastening female thread portion 56 of the axial-direction peripheral surface portion 55. The radial-direction flat surface portion 65 has a function of restricting a rotational motion of the projecting portion 64 when the lock nut main body portion 57 inclines to incline the projecting portion 64.

Then, when an external force in the axial direction is applied to an outer race contact surface 53 of the lock nut main body 57 from an outer race main body 41*b* of a ball bearing 41 as illustrated in FIG. 14, the lock nut main body 57 displaces to open outward in a direction away from the outer race main body 41*b* about a point on an outer peripheral side of the lock nut fastening male thread portion 54 formed on the outer peripheral side of the lock nut main body 57 as a fulcrum.

In this case, even when the lock nut main body 57 inclines and displaces in a direction away from the outer race main body 41*b*, the projecting portion 64 is brought into contact with the radial-direction flat surface portion 65 to restrict the inclination itself of the lock nut main body 57. Thus, transmission of the external force from the outer race main body 41*b* to a distal end of the loosening prevention protruding portion 59 is prevented. When the projecting portion 64 cannot fully receive the external force in the axial direction, the external force can be buffered by any one of the lock nut recessed portions 61, 62, and 63 described above.

As a result, inclination of the distal end surface of the loosening prevention protruding portion 59 with respect to a surface of the radial-direction abutting portion 60 is reduced, allowing a sufficient contact area between the loosening prevention protruding portion 59 and the radial-direction abutting portion 60 to be maintained. In this manner, a decrease in frictional force generated between the loosening prevention protruding portion 59 and the radial-direction abutting portion 60 is reduced.

Further, as illustrated in FIG. 9, the projecting portion 64 is separate from the radial-direction flat surface portion 65 so that a predetermined gap (Gr) is defined between the projecting portion 64 and the radial-direction flat surface portion 65 under a state in which the lock nut main body 57 is not subjected to an external force. The reason why the gap (Gr) is defined as described above is as follows. When the lock nut 51 is fastened, a fastening force (frictional force) for the lock nut 51, which is generated between the loosening prevention protruding portion 59 and the radial-direction abutting portion 60, can be obtained. Thus, the fastening force for the lock nut 51 is prevented from being distributed toward the projecting portion 64 and the radial-direction flat surface portion 65.

Example 4

Next, a fourth embodiment of the present invention is described. In the first embodiment or the second embodiment described above, the contact surfaces of the loosening prevention protruding portion 59 and the radial-direction abutting portion 60 are formed substantially flat. Meanwhile, a fourth embodiment proposes a structure in which each of contact surfaces of a loosening prevention protruding portion 59 and a radial-direction abutting portion 60 has an inclined portion for restricting inclination of a lock nut main body 57.

This embodiment also assumes a lock nut 51 having any one of the lock nut recessed portions 61, 62, and 63 according to the first embodiment or the second embodiment. In this case, however, the lock nut 51 having the outer peripheral-side lock nut recessed portion 61 is described.

Figure 10:
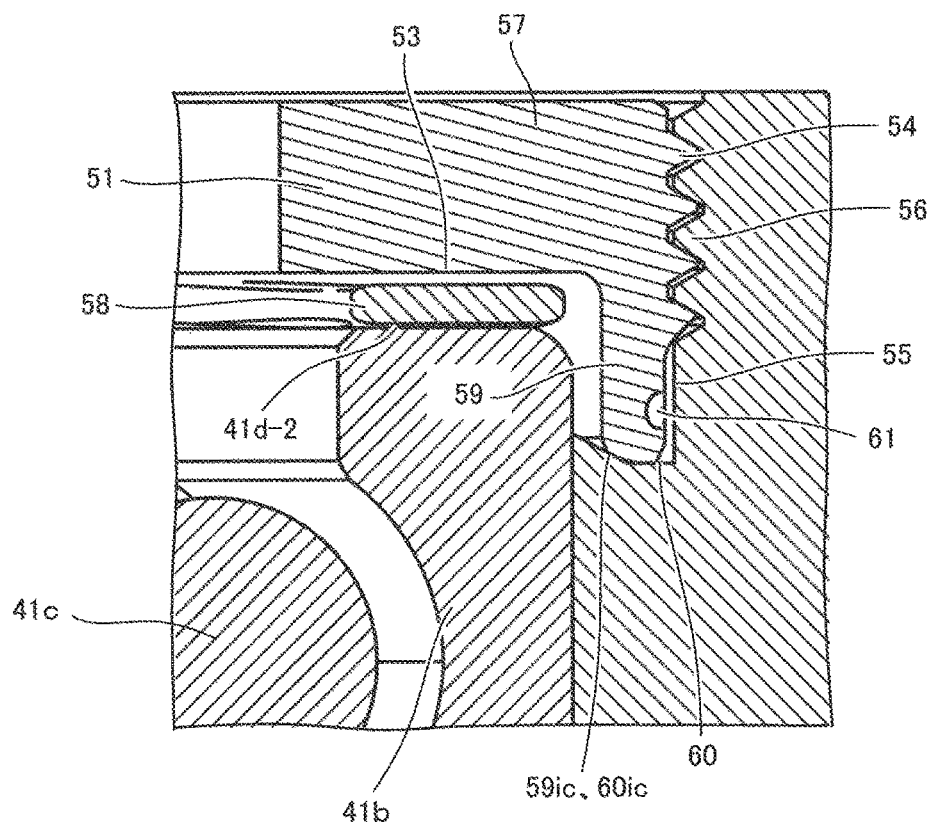
FIG. 10 is an enlarged sectional view of a main part including a lock nut and an outer race of a steering device according to a fourth embodiment of the present invention.
Figure 11:
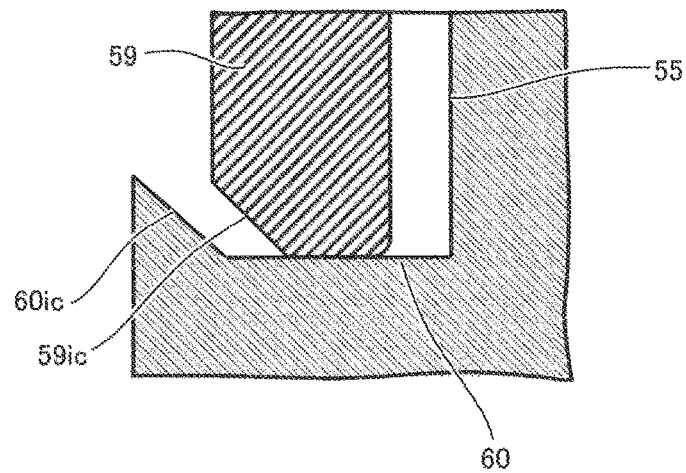
FIG. 11 is an enlarged sectional view of a main part, for illustrating details of a distal end of a loosening prevention protruding portion and a radial-direction abutting portion of FIG. 10.

In FIG. 10 and FIG. 11, a distal end of the loosening prevention protruding portion 59 has an inclined portion 59*ic* on its inner peripheral side. The inclined portion 59*ic* is inclined toward an outer race contact surface 53. The inclined portion 59*ic* is formed by chamfering an inner peripheral end surface of the distal end of the loosening prevention protruding portion 59 at a predetermined angle. With the inclined portion 59*ic*, a thickness of the loosening prevention protruding portion 59 in a radial direction becomes smaller in a direction toward the distal end of the loosening prevention protruding portion 59.

Meanwhile, a radial-direction abutting portion 60 has a rotation restricting inclined portion 60*ic* on a side closer to an outer race main body 41*b* side. The rotation restricting inclined portion 60*ic* is formed in a shape complementary to a shape of the inclined portion 59*ic*. The rotation restricting inclined portion 60*ic* has a shape with a thickness from a flat surface of the radial-direction abutting portion 60, which increases in a direction toward an outer peripheral surface of the outer race main body 41*b*. Then, an angle of the inclined portion 59*ic* and an angle of the rotation restricting inclined portion 60*ic* are set to the same angle, or substantially the same angle.

The inclined portion 59*ic* and the rotation restricting inclined portion 60*ic* have a function of restricting a rotational motion of the lock nut main body portion 57 when the lock nut main body portion 57 inclines to incline the loosening prevention protruding portion 59.

When an external force in the axial direction is applied to an outer race contact surface 53 of the lock nut main body 57 from the outer race maim body 41b of the ball bearing 41 as illustrated in FIG. 14, the lock nut main body 57 displaces to open outward in a direction away from the outer race main body 41b about a point on an outer peripheral side of the thread portion 54 formed on an outer peripheral side of the lock nut main body 57 as a fulcrum.

In this case, even when the lock nut main body 57 inclines and displaces in a direction away from the outer race main body 41b, the inclined portion 59ic of the loosening prevention protruding portion 59 is brought into contact with the rotation restricting inclined portion 60ic of the radial-direction abutting portion 60 to restrict the inclination itself of the lock nut main body 57.

Thus, even when the external force from the outer race 41 is transmitted to the distal end of the loosening prevention protruding portion 59, the inclined portion 59ic and the rotation restricting inclined portion 60ic restrict a rotational motion of the loosening prevention protruding portion 59. As a result, inclination of the distal end surface of the loosening prevention protruding portion 59 with respect to a surface of the radial-direction abutting portion 60 is reduced, allowing a sufficient contact area between the loosening prevention protruding portion 59 and the radial-direction abutting portion 60 to be maintained. As a result, a decrease in frictional force generated between the loosening prevention protruding portion 59 and the radial-direction abutting portion 60 is reduced.

Example 5

Next, a fifth embodiment of the present invention is described. The first embodiment to the fourth embodiment described above have described a structure in which a decrease in contact area of the contact surfaces of the loosening prevention protruding portion 59 and the radial-direction abutting portion 60 is reduced. However, the fifth embodiment proposes a structure in which rotation of a lock nut 51 in a loosening direction is reduced.

This embodiment also assumes a lock nut 51 having any one of the lock nut recessed portions 61, 62, and 63 according to the first embodiment or the second embodiment. In this case, a lock nut 51 having the outer peripheral-side lock nut recessed portion 61 is described.

Figure 12:
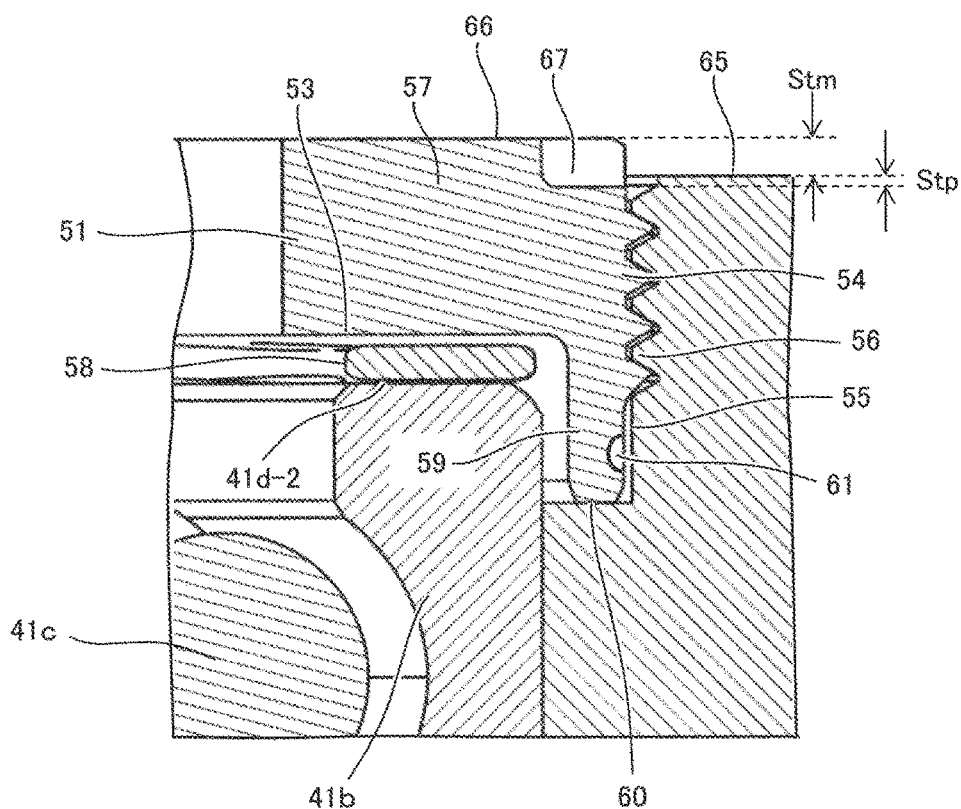
FIG. 12 is an enlarged sectional view of a main part including a lock nut and an outer race of a steering device according to a fifth embodiment of the present invention.
Figure 13:
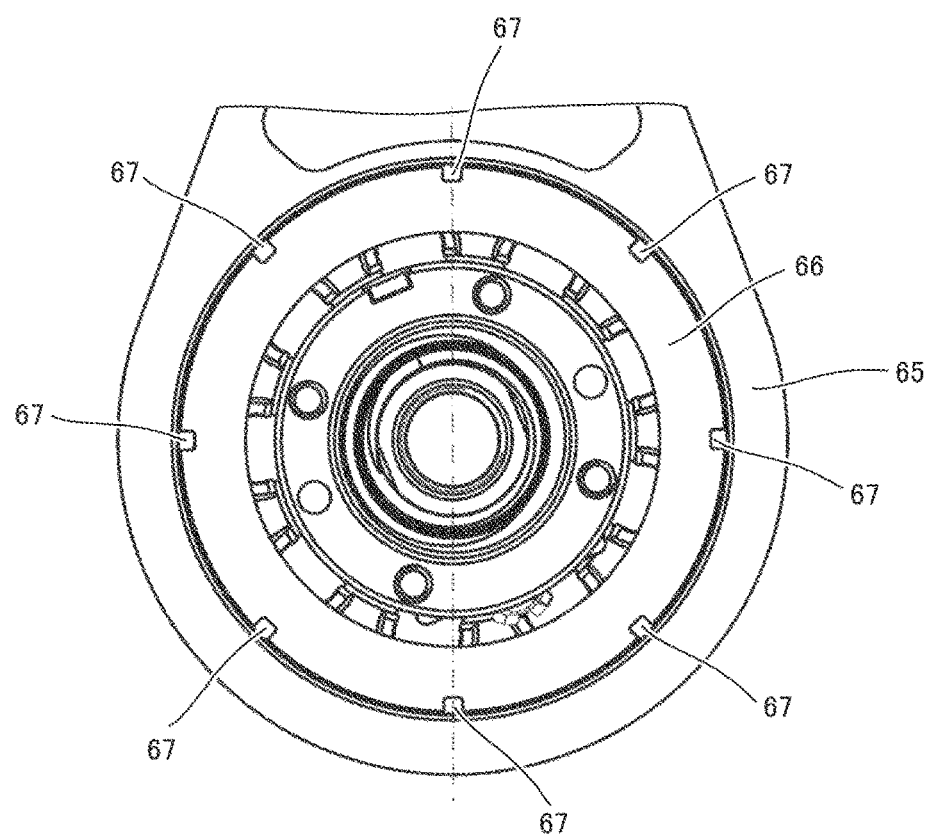
FIG. 13 is a side view of the lock nut side of FIG. 12 when viewed in an axial direction of a rack bar.

In FIG. 12 and FIG. 13, a main body end surface portion 66 of a lock nut main body 57 on a side opposite to an outer race contact surface 53 projects to a side opposite to an outer race main body 41b by a predetermined length with respect to a radial-direction flat surface portion 65 defining a first transmission mechanism accommodating portion 36 under a state in which the lock nut 51 is fastened. A level difference between the radial-direction flat surface portion 65 and the main body end surface portion 66 is set to a level-difference length (Stm).

As illustrated in FIG. 13, plastic deformation portions 67 are formed across a contact portion between the main body end surface portion 66 and the radial-direction flat surface portion 65 when viewed in the radial direction. The plastic deformation portions 67 can be formed by pressing the vicinity of the contact portion between the main body end surface portion 66 and the radial-direction flat surface portion 65 in the axial direction with use of a caulking tool having a tapered distal end.

The main body end surface portion 66 and the radial-direction flat surface portion 65 are caulked and fixed in the vicinity of the contact portion between the main body end surface portion 66 and the radial-direction flat surface portion 65 through deformation of a portion of the main body end surface portion 66 toward the radial-direction flat surface portion 65, deformation of a portion of the radial-direction flat surface portion 65 toward the main body end surface portion 66, or deformation of both of the portions. As illustrated in FIG. 13, the plastic deformation portions 67 are formed at equal intervals along an outer periphery of the main body end surface portion 66. In this embodiment, eight plastic deformation portions 67 are formed.

As described above, the plastic deformation portions 67 are formed across the contact portion between the main body end surface portion 66 and the radial-direction flat surface portion 65 by caulking and fixing. Thus, rotation of the lock nut 51 in a loosening direction is inhibited, enabling prevention or reduction of loosening of the lock nut 51.

In this case, bottom surfaces of the caulked (or staked) recessed portions 67 formed by caulking the main body end surface portion 66 are retreated toward an outer race main body 41b by a predetermined length with respect to the radial-direction flat surface portion 65 defining the first transmission mechanism accommodating portion 36 under a state in which the lock nut 51 is fastened.

A level difference between the radial-direction flat surface portion 65 and the bottom surfaces of the caulked recessed portions 67 is set to a level difference length (Stp). The level difference lengths are set to have a relationship of "Stp<Stm". In this case, the level difference lengths refer to a distance between the main body end surface portion 66 and the radial-direction flat surface portion 65 and a distance between the bottom surfaces of the caulked recessed portions 67 and the radial-direction flat surface portion 65 in the direction of the axis of the lock nut 51, respectively. The above-mentioned setting of the level-difference lengths reduces the level difference between the bottom portions of the caulked recessed portions 67 and the radial-direction flat surface portion 65 to improve an effect of caulking and fixing.

As described above, in the present invention, the lock nut fixes the outer race of the turning nut threadably engaged with the steering shaft. The loosening prevention protruding portion formed on the lock nut main body is brought into contact with the radial-direction abutting portion to prevent loosening of the lock nut with the frictional force. At the same time, the lock nut recessed portion for reducing the mechanical stiffness is formed in a part of the loosening prevention protruding portion or a part of the lock nut main body. An external force acting from the outer race is buffered at the lock nut recessed portion to restrict inclination of the loosening prevention protruding portion, reducing a decrease in contact area between the loosening prevention protruding portion and the radial-direction abutting portion.

The above-mentioned configuration including the lock nut recessed portion prevents transmission of the external force to the distal end of the loosening prevention protruding portion even when the lock nut main body is inclined by the external force acting from the outer race. Thus, inclination of the loosening prevention protruding portion is restricted, reducing a decrease in contact area between the loosening prevention protruding portion and the radial-direction abutting portion. In this manner, loosening of the lock nut can be prevented.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-156384 filed on Aug. 29, 2019. All disclosed contents including Specification, Scope of Claims, Drawings, and Abstract of Japanese Patent Application No. 2019-156384 filed on Aug. 29, 2019 are incorporated herein by reference in their entirety.

REFERENCE SIGNS LIST

5 . . . rack bar, 10 . . . rack housing, 12 . . . first rack housing part, 13 . . . second rack housing part, 36 . . . first transmission mechanism accommodating portion, 37 . . . second transmission mechanism accommodating portion, 38 . . . turning nut, 41 . . . ball bearing, 41$a$ . . . inner race, 41$b$ . . . outer race, 41$c$ . . . ball, 41$b$-1 . . . one end surface, 41$b$-2 . . . another end surface, 50 . . . bolt, 51 . . . lock nut, 52 . . . radial-direction end surface portion, 53 . . . outer race contact surface, 54 . . . male thread portion, 55 . . . axial-direction peripheral surface portion, 56 . . . female thread portion, 57 . . . lock nut main body, 58 . . . wave washer, 59 . . . loosening prevention protruding portion, 59$ic$ . . . inclined portion, 60 . . . radial-direction abutting portion, 60$ic$ . . . rotation restricting inclined portion, 61 . . . outer peripheral-side lock nut recessed portion, 62 . . . inner peripheral-side lock nut recessed portion, 63 . . . root-side lock nut recessed portion, 64 . . . projecting portion, 65 . . . radial-direction flat surface portion, 66 . . . main body end surface portion, 67 . . . plastic deformation portion

The invention claimed is:

1. A steering device for driving steered wheels of an automobile, the steering device comprising:
a housing internally including a turning shaft accommodating space, a speed reducer accommodating space, an outer race abutting portion, a lock nut fastening female thread portion, and a lock nut abutting portion;
a turning shaft, which is provided in the turning shaft accommodating space, and includes a turning shaft main body having a bar-like shape and a turning shaft ball screw groove formed on an outer peripheral side of the turning shaft main body;
a turning nut, which is provided in the speed reducer accommodating space, includes a nut main body having a tubular shape, a nut ball screw groove formed on an inner peripheral side of the nut main body, and an inner race groove formed on an outer peripheral side of the nut main body, and is threadably engaged with an outer periphery of the turning shaft;
a plurality of circulating balls, which are provided between the turning shaft ball screw groove and the nut ball screw groove, and are configured to transmit a rotational force of the turning nut to the turning shaft;
a ball bearing, which is provided in the speed reducer accommodating space, and includes an outer race including an outer race main body having a tubular shape and an outer race groove formed on an inner peripheral side of the outer race main body, and balls provided between the inner race groove formed on the outer peripheral side of the nut main body and the outer race groove;
an electric actuator configured to apply a rotational force to the turning nut; and
a lock nut, which is provided in the speed reducer accommodating space, and includes a lock nut main body, a lock nut fastening male thread portion, a loosening prevention protruding portion, and a lock nut recessed portion,
wherein the lock nut main body is provided in such a manner that the outer race is sandwiched between the lock nut main body and the outer race abutting portion in a direction of an axis of the turning shaft,
wherein the lock nut fastening male thread portion is formed on an outer peripheral side of the lock nut main body so as to be threadably engageable with the lock nut fastening female thread portion,
wherein the loosening prevention protruding portion is formed to protrude from the lock nut main body in the direction of the axis of the turning shaft, and, when the lock nut is fastened to the housing, the loosening prevention protruding portion is contactable with the lock nut abutting portion so as to generate a fastening force for the lock nut, and
wherein the lock nut recessed portion is formed in the loosening prevention protruding portion so that a thickness of the loosening prevention protruding portion in a radial direction orthogonal to the axis of the turning shaft becomes smaller than a thickness of a region of the loosening prevention protruding portion, which is adjacent to the lock nut recessed portion, or is formed in the lock nut main body so that a thickness of the lock nut main body in the direction of the axis of the turning shaft becomes smaller than a thickness of a region of the lock nut main body, which is adjacent to the lock nut recessed portion.

2. The steering device according to claim 1, wherein the lock nut recessed portion is formed in the loosening prevention protruding portion.

3. The steering device according to claim 2, wherein the lock nut recessed portion is a recessed portion being open toward an outer peripheral side of the loosening prevention protruding portion or a recessed portion being open toward an inner peripheral side of the loosening prevention protruding portion in a radial direction orthogonal to an axis of the lock nut.

4. The steering device according to claim 3, wherein the lock nut recessed portion is a recessed portion being open toward the outer peripheral side of the loosening prevention protruding portion in the radial direction orthogonal to the axis of the lock nut.

5. The steering device according to claim 3, wherein the lock nut recessed portion is formed in the loosening prevention protruding portion at a position being separate from a contact portion of the loosening prevention protruding portion with the lock nut abutting portion by a predetermined distance in the direction of the axis of the turning shaft.

6. The steering device according to claim 1,
wherein the lock nut has a projecting portion, which is formed on an outer peripheral side of the lock nut main body, and projects outward in a radial direction orthogonal to the axis of the turning shaft, and wherein the projecting portion is formed so as to be contactable with an outer peripheral-side surface of an opening edge of the lock nut fastening female thread portion when an external force acts from the outer race toward the lock nut main body.

7. The steering device according to claim 6, wherein a gap having a predetermined length is defined between the projecting portion and the outer peripheral-side surface of the opening edge of the lock nut fastening female thread portion.

8. The steering device according to claim 1,
wherein a surface of the loosening prevention protruding portion and a surface of the lock nut abutting portion, which are in contact with each other, have inclined portions inclined in a complementary manner, respectively, and
wherein the inclined portions have inclined surfaces, which restrict inward movement of a distal end of the loosening prevention protruding portion.

9. The steering device according to claim 1, wherein regions plastically deformed toward the lock nut main body are formed on an outer peripheral side of an opening edge of the lock nut fastening female thread portion, or regions plastically deformed toward the outer peripheral side of the opening edge of the lock nut fastening female thread portion are formed on the lock nut main body.

10. The steering device according to claim 9,
wherein each of the plastically deformed regions has a caulked portion,
wherein the caulked portions are formed in the lock nut main body, and each has a recessed portion being open in the direction of the axis of the turning shaft, and
wherein a level difference length between bottom surfaces of the recessed portions of the caulked portions and an outer peripheral-side surface of the opening edge of the lock nut fastening female thread portion is set to be smaller than a level difference length between an end surface of the lock nut main body on a side opposite to the loosening prevention protruding portion and the outer peripheral-side surface of the opening edge of the lock nut fastening female thread portion.

* * * * *